US010674083B2

(12) United States Patent
Emmett et al.

(10) Patent No.: US 10,674,083 B2
(45) Date of Patent: *Jun. 2, 2020

(54) AUTOMATIC MOBILE PHOTO CAPTURE USING VIDEO ANALYSIS

(71) Applicant: Xerox Corporation, Norwalk, CT (US)

(72) Inventors: Phillip J. Emmett, Rochester, NY (US); Raja Bala, Pittsford, NY (US); Michael R. Furst, Penfield, NY (US); Lina Fu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,353

(22) Filed: May 30, 2018

(65) Prior Publication Data

US 2018/0278845 A1    Sep. 27, 2018

Related U.S. Application Data

(63) Continuation of application No. 14/885,186, filed on Oct. 16, 2015, now Pat. No. 10,015,397, which is a
(Continued)

(51) Int. Cl.
*H04N 5/232* (2006.01)
*G06K 9/00* (2006.01)
(Continued)

(52) U.S. Cl.
CPC ..... *H04N 5/23245* (2013.01); *G06K 9/00355* (2013.01); *G06K 9/00442* (2013.01);
(Continued)

(58) Field of Classification Search
CPC ...... H04N 5/23245; G06T 2207/30176; G06K 9/00496
See application file for complete search history.

(56) References Cited

U.S. PATENT DOCUMENTS 6,647,535 B1    11/2003   Bozdagi et al.
6,947,609 B2    9/2005    Seeger et al.
(Continued)

OTHER PUBLICATIONS

Shafait et al., "Document Cleanup Using Page Frame Detection", International Journal on Document Analysis and Recognition, vol. 11, No. 2, 2008, pp. 81-96.
(Continued)

*Primary Examiner* — Christopher K Peterson
(74) *Attorney, Agent, or Firm* — Fox Rothschild LLP (57) ABSTRACT

A system creates an electronic file corresponding to a printed artifact by launching a video capture module that causes a mobile electronic device to capture a video of a scene that includes the printed artifact. The system analyzes image frames in the video in real time as the video is captured to identify a suitable instance. In one example, the suitable instance is a frame or sequence of frames that contain an image of a page or side of the printed artifact and that do not exhibit a page-turn event. In response to identification of the suitable instance, the system will automatically cause a photo capture module of the device to capture a still image of the printed artifact. The still image has a resolution that is higher than that of the image frames in the video. The system will save the captured still images to a computer-readable file.

9 Claims, 8 Drawing Sheets

Related U.S. Application Data continuation of application No. 13/972,346, filed on Aug. 21, 2013, now Pat. No. 9,247,136.

(51) Int. Cl.
*G06K 9/32* (2006.01)
*G06K 9/22* (2006.01)
*G06K 9/03* (2006.01)

(52) U.S. Cl.
CPC ......... *G06K 9/00496* (2013.01); *G06K 9/036* (2013.01); *G06K 9/228* (2013.01); *G06K 9/32* (2013.01)

(56) References Cited

U.S. PATENT DOCUMENTS

| | | | |
|---|---|---|---|
| 9,241,102 B2 | 1/2016 | Bala et al. | |
| 2001/0045986 A1 | 11/2001 | Edwards | |
| 2002/0186425 A1 | 12/2002 | Dufaux et al. | |
| 2004/0215689 A1* | 10/2004 | Dooley | G06F 3/017 |
| | | | 709/200 |
| 2008/0079817 A1 | 4/2008 | Murata et al. | |
| 2008/0111892 A1 | 5/2008 | Kwon | |
| 2009/0189999 A1 | 7/2009 | Noh | |
| 2009/0263028 A1 | 10/2009 | Kwon | |
| 2010/0007896 A1* | 1/2010 | Fishbaine | G01N 21/8806 |
| | | | 356/603 |
| 2010/0189356 A1 | 7/2010 | Sugita | |
| 2010/0202026 A1 | 8/2010 | Chiu et al. | |
| 2011/0109770 A1 | 5/2011 | Katoh | |
| 2011/0229056 A1* | 9/2011 | Robertson | G06T 7/248 |
| | | | 382/294 |
| 2013/0140356 A1 | 6/2013 | Fan et al. | |
| 2013/0155474 A1 | 6/2013 | Roach et al. | |
| 2013/0182002 A1* | 7/2013 | Macciola | H04N 1/387 |
| | | | 345/589 |
| 2013/0250379 A1* | 9/2013 | Rigazio | H04N 1/19594 |
| | | | 358/538 |
| 2014/0268247 A1* | 9/2014 | Sakaida | H04N 1/387 |
| | | | 358/406 |

OTHER PUBLICATIONS

Ye et al., "Unsupervised Feature Learning Framework for No-reference Image Quality Assessment", IEEE Internationa Conference on Computer Vision and Pattern Recognition (CVPR), Providence, RI, 2012.

Liu, et al., "Fast Directional Chamfer Matching", IEEE International Conference on Computer Vision and Pattern Recognition (CVPR), San Francisco, 2010.

Kumar et al., "Mobile Video Capture of Multi-page Documents", Computer Vision and Pattern Recognition Workshops (CVPRW) 2013, IEEE Conference, Jun. 23-28, 2013, 6 pp.

\* cited by examiner

AUTOMATIC MOBILE PHOTO CAPTURE USING VIDEO ANALYSIS

RELATED APPLICATIONS AND CLAIM OF PRIORITY

This patent application claims priority to and is a continuation of U.S. patent application Ser. No. 14/885,186, filed Oct. 16, 2015, which in turn is a continuation of U.S. patent application Ser. No. 13/972,346 (now U.S. Pat. No. 9,247,136), filed Aug. 21, 2013. The disclosures of each priority application are fully incorporated into this document by reference.

BACKGROUND

Mobile electronic devices, such as smart phones, tablet computers, and other portable electronic computing devices, are increasingly being used for capturing and processing data. Typically, a mobile electronic device includes a high quality camera that includes both still photo and video image capture capabilities.

Mobile electronic device applications are available that capture images of printed artifacts, such as documents or other items that contain printed material on a substrate. However, such applications necessitate manual capture of one page of the document at a time. Furthermore, the captured images may suffer from distortions arising from motion of the document, camera shake, inadequate lighting, shadows, or other external influences.

This disclosure describes methods and systems that are directed to solving at least some of the issues described above, and/or additional issues.

SUMMARY

In an embodiment, a mobile electronic device creates an electronic file corresponding to a printed artifact by launching a video capture module to capture a video of a scene that includes a printed artifact. The video includes a series of image frames. The device includes or is in communication with a system that executes a decision module that analyzes at least a subset of the image frames in the series in real time as the video is captured to identify a suitable instance of an image frame. To identify a suitable instance, the system identifies a subset of one or more image frames in the series and determines whether the subset satisfies one or more criteria. Upon identification of the suitable instance, the system will automatically cause a photo capture module to capture a still image of the printed artifact. The still image has a resolution that may be substantially higher than the resolution of the image frames from the video. Thus, the system may use subsampling to produce relatively low-resolution video images which are used to quickly identify suitable images to capture, and it may then capture and save relatively high-resolution images only upon detection of suitable instances. The system will save the still image to a computer-readable file.

Optionally, upon identification of the suitable instance, the system may stop the video capture module before switching to high resolution still capture mode. After capturing the still image, the system may stop the photo capture module, resume the video capture module, and continue to analyze image frames as the video is captured by the video capture module to identify additional suitable instance. Each additional suitable instance may be an image or set of images that contains a facet of the printed artifact that differs from the facet in the previous suitable instance. Upon identification of each suitable instance, the system may automatically switch back to the photo capture module to capture an additional still image of the printed artifact, and the system may save each captured still image in a single computer-readable file, such as in a file representing a multi-faced document.

Optionally, after capturing some or all of the still images, the system may use a display to present each captured still image to a user for editing. Via the user interface, the user may enter, and the system may receive, one or more edits to one or more of the captured still images. If so, the system may include the edits when saving each captured still image in the computer-readable file. The edits may involve and/or the system may automatically perform, one or more image processing operations such as de-skew, de-rotation, perspective correction, automatic cropping, image enhancement, or image binarization on the captured still images.

In some embodiments, the system may provide the user with feedback that may help improve the quality of the captured image. For example, after analyzing a particular one of the image frames, if the system determines that the particular image frame failed to satisfy one or more of the criteria it may execute a feedback module. The feedback module may present, via a user interface in real time while the device continues to capture the video, feedback for modification of a parameter of the device or the scene so that a subsequently captured image frame in the video will be a suitable instance for still capture.

In some embodiments, the system may rely in part on data from an accelerometer, gyroscope or other motion sensor to help identify a suitable instance. For example, when analyzing the image frames to identify the suitable instance, the system may receive motion sensor data as the video is captured and correlate the motion sensor data to the analyzed image frames. For each analyzed frame, the system may use the correlated motion sensor data to estimate an amount of camera motion in the analyzed frame, and it may consider the analyzed frame to correspond to a suitable instance only if the estimated amount of motion in the frame is less than a threshold.

In addition, or alternatively, the system may measure one or more aspects of the image frame itself to determine whether a moving object (such as moving hand or a turning page) exists in the frame. To do so, the system may detect the presence of a moving object in an analyzed frame by dividing the analyzed frame into a set of N×N sub-blocks of pixels, where N equals an integer N>1. For each sub-block, the system may determine a standard deviation of luminance values of the pixels within each sub-block and compare the standard deviation with a standard deviation of a corresponding sub-block in a reference frame for which there is known to be no object presence to yield a difference. If the difference is greater than a threshold, then the system may conclude that the analyzed frame includes the presence of a moving object.

Optionally, the system may use border detection methods to identify the suitable instance. For example, for any analyzed frame, the system may detect borders of the printed artifact, and it may determine that the analyzed frame satisfies one or more of the image quality criteria if one or more of the following criteria are met: (i) all borders of the printed artifact are detected; (ii) a shape formed by the borders is substantially a rectangle or square; or (iii) a determined area enclosed by the detected borders relative to a determined area of the video frame is greater than a threshold. Suitable border detection methods may include, without limitation, a template matching technique, a Hough Transform technique, or a constant color border identification technique.

In some embodiments, the criteria used to identify a suitable instance may include a requirement that the image have at least a threshold image quality score representing machine readability of the printed artifact. For each analyzed frame, the system may determine an image quality score for the frame. An image frame may be considered to satisfy the criteria if it has an image quality score that exceeds the threshold. To determine an image quality score, the system may use any suitable method such as extracting a set of image patches from the frame, determining a feature vector for each of the patches from the frame, pooling the determined feature vectors across the frame, and retrieving a score for the frame by processing the pooled features via a classifier.

Optionally, the system may not analyze each frame in the video at full spatial resolution. Instead, it may subsample the series of image frames according to a spatial or temporal sampling criterion so that a representative set of image frames in the video is analyzed.

DETAILED DESCRIPTION

The embodiments described in this disclosure relate to video capture by a mobile device of a printed artifact, such as a single-page, multi-page, or otherwise multifaceted document, and processing of the video in order to automatically trigger one or more still photo captures of high resolution by the mobile device of the said printed artifact. This disclosure is not limited to the particular systems, devices and methods described, as these may vary. The terminology used in the description is for the purpose of describing the particular versions or embodiments only, and is not intended to limit the scope.

As used in this disclosure, the singular forms "a," "an," and "the" include plural references unless the context clearly dictates otherwise. Unless defined otherwise, all technical and scientific terms used herein have the same meanings as commonly understood by one of ordinary skill in the art. As used in this disclosure, the term "comprising" means "including, but not limited to."

For the purposes of this disclosure, a "printed artifact" or "artifact" refers to a substrate on which alphanumeric characters, images and/or other content items have been printed. Reference to an artifact as "multifaceted" means that the artifact includes multiple substrates or surfaces (e.g., multiple pages, or two sides of a single page) on which content has been printed. Examples of such artifacts include a multi-page document, a book, a brochure, a two-sided check or the two sides of a driver's license. The term "multifaceted" also may refer to an artifact that is physically large in size such that a user of a camera would be required to capture multiple still photographs in order capture the entire document with sufficient resolution to read the alphanumeric content. Examples of the second type of multifaceted document include a poster, engineering drawing (e.g., a blueprint), billboard or other large printed surface.

A "mobile electronic device" refers to a portable computing device that includes an image capturing device, a processor and non-transitory, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

A "video capture module" refers to a software application and/or the image sensing hardware of an electronic device that is capable of optically viewing a scene and converting an interpretation of that scene into electronic signals so that the interpretation is saved to a digital video file comprising a series of images.

A "photo capture module" refers to a software application and/or the image sensing hardware of an electronic device that is capable of optically viewing a scene and converting an interpretation of that scene into electronic signals so that the interpretation is saved to a digital image file comprising a single, still image.

A smart phone, tablet, handheld video camera, or other mobile electronic device includes an image sensor and programming to implement both a video capture module and a photo capture module. The two modules may be separate entities, or they may simply be different features or capabilities combined in a single module.

A "decision module" refers to a software application that receives data or analysis from the video capture module and other sensors and applies one or more rules to determine whether the data or analysis satisfies one or more predefined criteria for triggering still photo capture. The module may employ different strategies to rank, weight and combine the analysis corresponding to the various sensing modules in order to make a final decision towards suitable instance for still capture.

The use of mobile devices for scanning hardcopy content comes with unique opportunities as well as unique challenges. Advantages may include low cost, portability, ubiquity, increasing computational power, and/or the presence of multiple sensors on a single device. One of the challenges with existing systems is that it is cumbersome to capture a multifaceted printed artifact such as a multi-page document. In prior systems, a user may use an imaging application to take multiple still photos, one for each page of the document. The photos may then be bundled into a single collection or file. The multiple captures are cumbersome and time consuming.

To avoid these difficulties, this disclosure describes the capture and analysis of real-time incoming or streaming video to automatically trigger capture of one or more still photos of printed artifacts. If the system were to merely capture a video of the document, the raw video file could be prohibitively large for storage or transmission. If the system were to capture a large number of high-resolution frames, the resulting files would also be prohibitively large. The method and system described in this disclosure address that problem by automatically analyzing a video as it is received, and by capturing still images only when the video analysis will meet established quality criteria.

In one embodiment, the disclosure teaches a system comprising a video capture module capturing relatively low resolution video, a decision module connected physically or logically to the mobile device that analyzes frames from the video in real time as they are received to identify frames satisfying one or more criteria for triggering high resolution still capture, a photo capture module for capturing high resolution still images, and optionally a feedback module for notifying and assisting the user towards high quality capture. In this disclosure, references to the terms "low resolution" and "high resolution" are not intended to refer to specific numeric values but instead as relative measurements, such that a high resolution item has a resolution that may be substantially higher than a low resolution. The analysis of frames may include temporal and/or spatial subsampling of frames in the video to reduce computation requirements. To identify frames satisfying one or more criteria to trigger a still image capture, the decision module in the system may apply one or more of: (i) video analysis to avoid frames exhibiting significant motion in the scene, such as that which might arise from camera movement, the user's hand interacting with the artifact, or a page of the artifact turning; (ii) use of accelerometer and gyroscope data to detect frames involving significant camera shake; or (iii) use of an image quality metric to identify a high-quality frame. The decision module would receive the analyses from each of the aforementioned elements, and apply rules to rank, weight and combine the multiple analyses in order to make a final decision towards suitable instance for high resolution still capture. This process is repeated for each printed facet captured by the user. Finally, the system may combine all of the high-quality still images into a digital output file representing all the captured facets of the original printed artifact.

Figure 1:
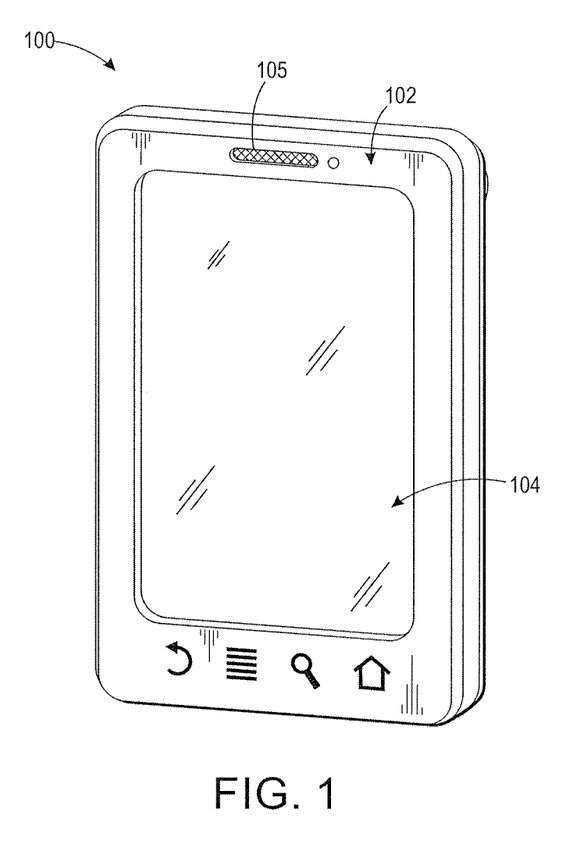
FIG. 1 depicts a first or front face of a mobile device that includes a video camera configured to capture a series of images according to an embodiment.

FIG. 1 shows one example of a mobile electronic device, generally designated 100. The mobile electronic device 100 may include a front face 102 and a display 104. The display 104 may be any suitable component for displaying images, such as, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, such as, but not limited to, resistive touchscreens, capacitive touchscreens, and infrared touchscreens.

Figure 2:
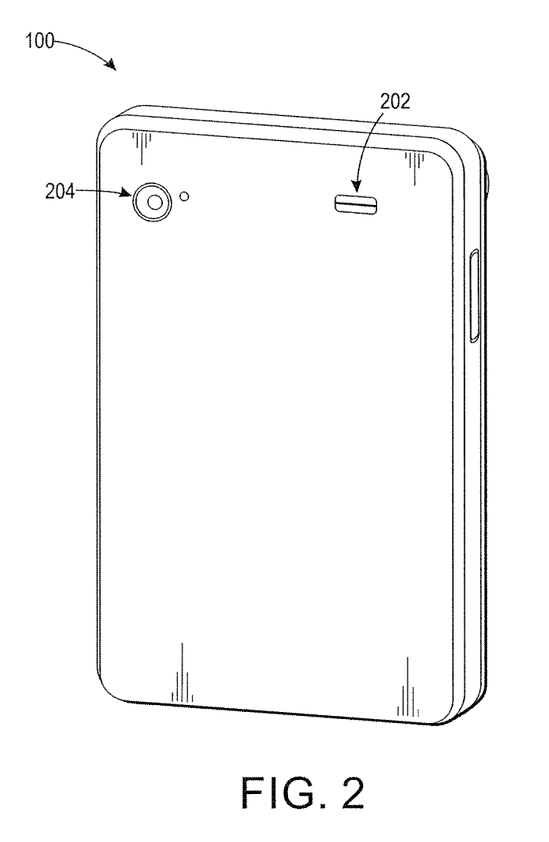
FIG. 2 depicts a second or rear face of a mobile device that includes a video camera configured to capture a series of images according to an embodiment.

FIG. 2 shows a rear face 202 of the mobile electronic device 100. The rear face 202 may include an image capture device 204. The image capture device 204 may be any suitable component capable of receiving an optical image and transmitting the information to other components for processing.

While the image capture device 204 is depicted on the rear face of the present example, persons skilled in the art will appreciate that the imaging device 204 may be positioned at any location upon any face of the mobile device 100, or it may even be external to the mobile device 100 and connected by any means of electronic communication, such as, but not limited to, physical cable communication such as universal serial bus (USB), wireless radio communication, wireless light communication, or near field communication technology.

In some embodiments, the display 104 may be positioned within the mobile device 100, and it may be configured in such a way so as to display the output of the imaging device 204 in real time so that the user may view the display 104 and see the output of the imaging device 204 on the display. The display 104 is one type of user interface that the device may include. The device may include other types of user interfaces such as an audio output 105, such as a speaker or audio port.

Accordingly, the configuration of the mobile device 100 as shown in FIGS. 1 and 2 is only an example, and persons skilled in the art will appreciate that other configurations are able to achieve a similar overall result.

Figure 3:
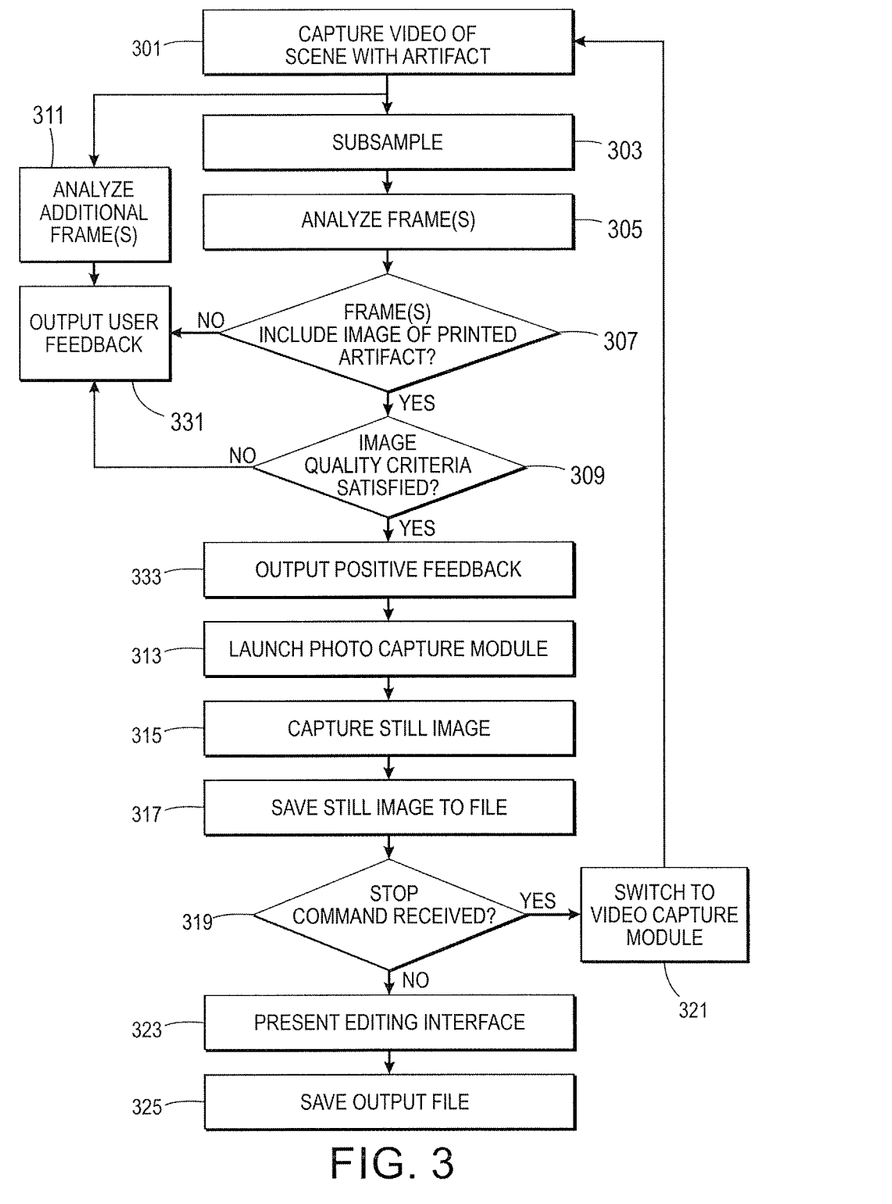
FIG. 3 is a flowchart that illustrates a method of processing a video to create a digital output file comprising one or more high-resolution images of a printed artifact.

FIG. 3 is a flowchart illustrating several steps that a system may follow to capture video of a printed artifact and capture high resolution still images of one or more facets of the artifact. In one embodiment, the artifact is a document such as a single-page document or multi-page document. Referring to FIG. 3, one or more sensing modules capture data in real time and report the data to a decision module. The sensing modules may include a video capture module of a mobile electronic device that, when initiated or launched, captures a video 301 of a scene that includes the artifact. The video capture may occur while the user moves the artifact, the image capture device, or both so that the video includes a sequence of image frames, at least some of which contain images of the artifact. For example, the user may operate the video capture module to receive an image sequence of: (i) a single-page document while the user moves the electronic device around an area of where the artifact exists; (ii) a multi-page document while the user turns the pages; (iii) a multi-page document where the pages are laid out side by side on a surface; (iv) a multi-sided document while the user flips the document over; or (v) a large document while the user moves the camera around to multiple facets (i.e., smaller areas) of the large document.

As the system receives the video image stream, a decision module of the system will automatically process the video to analyze a set of the received video image frames 305 to identify a suitable instance. A suitable instance is a condition in which an image frame or sequence of image frames both (a) includes an image of a facet of the printed artifact 307, and (b) satisfies one or more image quality criteria 309. The image of the facet may be required to be an image of an entire facet, or input parameters may be set to permit an image frame that contains at least a threshold portion of a facet to correspond to a suitable instance. The image quality criteria may be applied on a individual frame basis, or on a multiple frame bases (such as may be the case for motion detection, described below). For each analyzed frame, if the frame does not either (a) include an image of the artifact, or (b) satisfy the image quality criteria, the decision module will not consider the image frame to correspond to a suitable instance, and it will move to subsequent frame 311 in the video sequence and analyze the subsequent frame as before.

If the sequence of frames does include the artifact and satisfy the image quality criteria, the device will initiate a photo capture module 313 to automatically, optionally without any user input or external command, capture a still image of the artifact 315. The switch from video capture to still image capture may occur substantially immediately after the system determines that the video image frame was a suitable instance, in order to avoid any substantial movement of the device or the artifact. When the system operates the photo capture module, it may temporarily pause operation of the video capture module, stop the video capture module, or simply continue operating the video capture module concurrently with the photo capture module. The photo capture module may use the same image sensor as the video capture module used, or it may use a different sensor, but in either situation the still image will have a resolution that is higher, and in some cases substantially higher, than that of the corresponding video image frames. For example the still image may have a resolution that is at least twice that of the video image frames, at least three times that of the video image frames, at least four times that of the video image frames, at least five times that of the video image frames, or any other suitable level of improvement.

The system may save the still image to a computer readable memory as an image file or as part of a larger file 317. If the system does not receive a stop command 319, such as may occur if the user activates a stop command, or if the system operation reaches a timeout state, maximum number of images or maximum image file memory rule, or for any other reason, then the system may switch from the photo capture module back to the video capture module 321 and continue the process of analyzing the video and capturing additional still images as before. Optionally, when saving the additional images to a file, the system may automatically combine the still images into a single electronic document file that includes multiple images, saved as multiple pages, frames or other units in a document.

If the system does receive a stop command 319, then it may present a review and editing interface 323 through which a user may view each captured still image and edit the images if desired. Editing may include actions such as image modification, enhancement, removal, duplication or other actions initiated by the user. The system may also subject any or all of the captured still image frames to additional automatic post-processing operations such as perspective correction, automatic cropping, image enhancement, image binarization or other processing techniques to improve the resolution or clarity of any frame, or to yield substantial consistency across frames. Any now or hereafter known image processing technique for the processes listed above may be used in this image processing step. The resulting output file of edited still images may be stored 325 in any suitable image format, such as PDF, PowerPoint, JPEG, TIFF, or other formats. The output file may be saved to a data storage facility, such as a memory of the mobile electronic device. Optionally, the video and photo capture modules, data storage facility, and processor that performs the remaining steps may be part of the same mobile electronic device. In such an option, the processing may be performed as the video is captured into a data storage facility such as random access memory. Alternatively, the video capture module and/or data storage facility may be devices that are separate from the processor that performs the remaining steps, and the processor may perform its operations at a remote location that is in electronic communication with the electronic device.

When the system determines that an analyzed video image frame either (a) does not contain an suitable image of the artifact 307, or (b) does not satisfy the image quality criteria 309, then before analyzing another frame it may implement a feedback module to output constructive feedback 331 to the user to help the user adjust the electronic device to capture a better image. The feedback may include, for example, an audio, text and/or graphic output that guides the user to take an action such as "keep still," or to move the electronic device up, down, left, right, closer to, or further away from the artifact. Examples of feedback delivery systems are disclosed in, for example, U.S. patent application Ser. No. 13/459,790, filed Apr. 30, 2012, the disclosure of which is incorporated herein by reference in its entirety. As another option, when the system has detected a suitable instance of an image frame the feedback module may also output a positive feedback message 333, either before capturing the still image to prompt the user to keep the device still, or after capturing the still image to reinforce a positive condition. An example would be a text message such as "Photo Captured!".

Optionally, before analyzing any frame in the video sequence, to avoid slowing down the system the system may subsample 305 the video to reduce the size and/or number of frames of the video that will be analyzed. In one example, the system may perform spatial subsampling of each frame by a factor of 4 in x- and y-directions, which means only every $4^{th}$ pixel in the x and y directions are retained for analysis. The system may additionally or instead temporally subsample the video by a factor in order to reduce computational cost. For example, in one embodiment, the temporal subsampling factor may be 15, which means every $15^{th}$ frame is considered for analysis. Optionally, different subsamples may be used for different processing steps, and some steps may use the full video rather than a subsample. In general, the subsampling rate may depend on any of several factors such as spatial and temporal resolution of the video, the nature of the content being captured, and/or the storage and processing capability of the mobile device.

Analyzing a video frame image to determine whether it includes a facet of the artifact may be done using any suitable image processing technique, such as pattern recognition, edge detection, or other techniques. In some embodiments, the step of determining whether a frame or set of frames satisfies image quality criteria may include determining whether the image contained in the frames exhibits movement of an object such as page turn or hand interaction or camera motion. The criteria may require that the image not exhibit any, or not more than a threshold level of, motion in order to qualify for launching of the photo capture module. The measurement of motion may be a function of the output of various sensors, such as device motion sensor data, optionally time-correlated to the analyzed frame. If the image contains more than the threshold level of motion, the system may not consider the frame or set of frames to correspond to a suitable instance.

Figure 4:
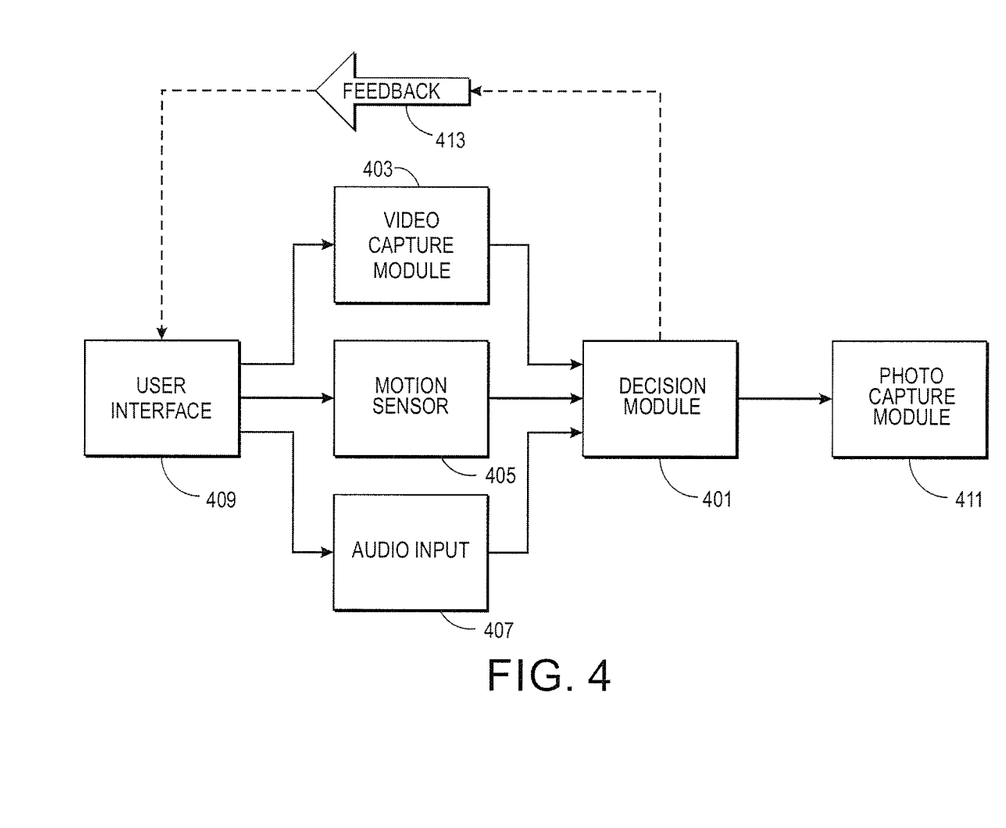
FIG. 4 is a block diagram illustrating possible interaction of various components of a video processing system.

FIG. 4 is a block diagram illustrating how various components of a mobile device may work together to measure motion. The device may include a decision module 401 that analyzes various input data to determine a suitable instance of an image frame that will trigger the system to switch from image capture by a low-resolution video capture module 403 to image capture by a high-resolution photo capture module 411. The input may include: image frames and/or analyzed data about image frames from the video capture module 403; data from one or more motion sensors 405, such as acceleration, orientation or other data from an accelerometer and/or gyroscope; and audio input 407 such as spoken commands. Based on its analysis of the various forms of data, the decision module may generate feedback 413 that may be presented to a user via a user interface 409 of the electronic device. The feedback may be, for example, a command to keep the device still, a command for the user to move the device closer to the printed artifact, or other feedback that will help improve quality of the captured image or which provides an assessment of existing image quality. The user interface may be a display or portion thereof, an audio output, or other interface.

As noted above, one method of identifying frames exhibiting significant motion involves invoking an algorithm to estimate motion between adjacent video frames. Many motion estimation techniques exist and can be broadly classified into spatial domain and frequency domain techniques. In one embodiment the system may employ a frequency domain approach referred to as phase correlation that is known to accurately estimate global translational motion in the presence of image noise. One simple instantiation of the phase correlation algorithm is now described. Let $f_1$ and $f_2$ be two images corresponding to successive frames from the low resolution video. Let $F_1$ and $F_2$ be the corresponding Fourier Transforms of $f_1$ and $f_2$ that may be computed via the well known Fast Fourier Transform. Note that $f_1$ and $f_2$ are functions of two spatial variables, and $F_1$ and $F_2$ are functions of two frequency variables. We compute the cross-power spectrum $F_1 \times F_2^*$, where $F_2^*$ is the complex conjugate of $F_2$. The phase R of the cross-power spectrum is obtained by dividing the spectrum by its magnitude:

$$R=(F_1 \times F_2^*)/|F_1 \times F_2^*|.$$

Taking the inverse Fourier transform of R, we obtain a two-dimensional phase correlation image, r. The spatial (x-y) location of the maximum peak value within image r is an estimate of the global translational motion vector between image frames $f_1$ and $f_2$. The magnitude of the motion vector may be passed along to the decision module. The decision module then compares the motion magnitude against a predefined threshold. If the threshold is exceeded, the motion-related criterion is not satisfied, and therefore still capture is not triggered. If the threshold is not exceeded, the motion-related criterion is satisfied and the current frame marks a potentially suitable instance for still capture.

As noted above, one method of identifying frames exhibiting significant object motion may include identifying page turn events. A page turn event may be considered to be an event that causes frames to exhibit a significant level of motion because a user's hand is turning a page. In one embodiment, the absolute differences in pixel intensity values between adjacent frames in the selected set are determined to yield an absolute difference image. If the pixels are stored as red, green, and blue values, then the system may determine a grayscale or luminance value as a weighted combination of pixel red, green, and blue values. The system also may determine an absolute difference in luminance values between adjacent frames. The system may apply a lowpass 2D filter on the absolute difference image. The system may apply a morphological erosion operator to remove small differences that may arise from effects such as shake and/or jitter. The resulting image may be binarized to produce binary blobs using a known binarization technique. The blobs may be stacked spatially over a number of successive frames, and the system may measure the size of the stacked blob. If the stacked blob size is greater than a threshold, then that frame may be deemed to exhibit significant movement of the user's hand over the artifact and therefore it is determined that a criterion for a low level of motion is not met.

Figure 8:
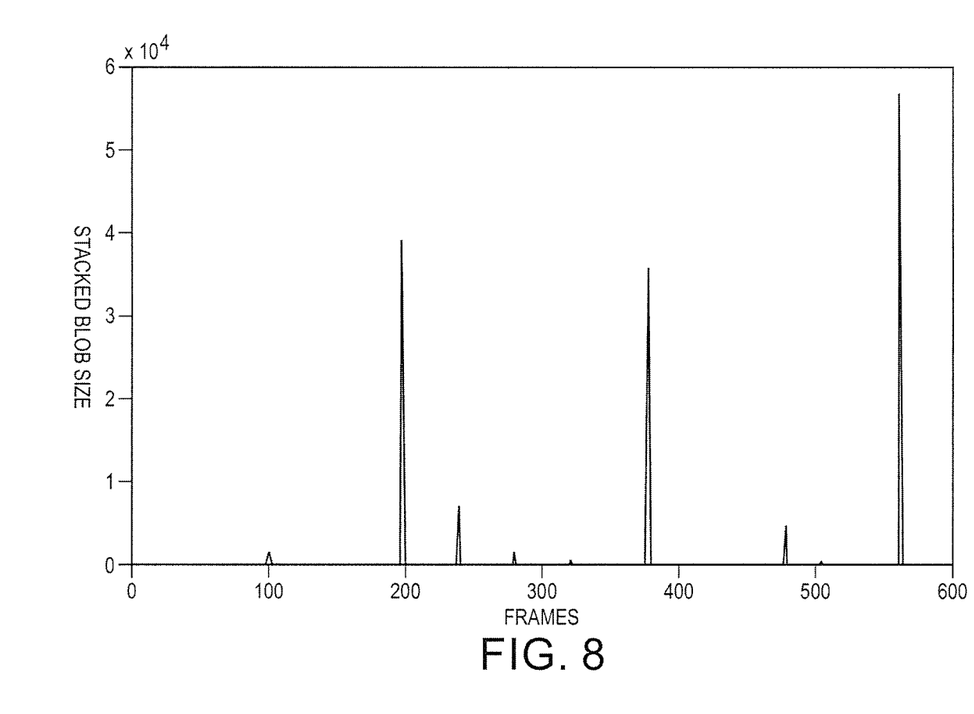
FIG. 8 illustrates data that a process may analyze when detecting page-turn events.

As an example, assuming a sampling rate of 30 frames per second and 1 to 2 seconds for a page-turn event, the system may detect 30-60 blobs during the whole event. The system may measure the size of blob stacked over, for example, 6 frames. An example of this is shown in FIG. 8, where the x-axis corresponds to a sequence of frames (or sub-sampled frames) in a video, and the y-axis shows stacked blob size. Peaks correspond to page turn events. Thus, because there are three peaks, the document analyzed is a three-page document. The periods where blob size is small correspond to low levels of motion. Thus, the motion related criterion is satisfied during these periods As noted above, another method of identifying frames exhibiting significant motion may include identifying object-hand interaction events. Such events may include the presence of a user's hand or other object on or near the artifact. One may assume that a user's hand is likely to interact with the printed artifact before and during page-turn. Thus, the system may analyze frames occurring just prior to the page-turn event and not trigger the photo module if the frame exhibits significant luminance change with respect to a reference frame for each page. A "significant" luminance change may be one that is greater than a fixed or adaptive threshold. The threshold may be assessed dynamically, or it may be predetermined. For example, the threshold may be a luminance level that has been measured from a reference frame that is known to not include the presence of a user's hand.

Figure 5:
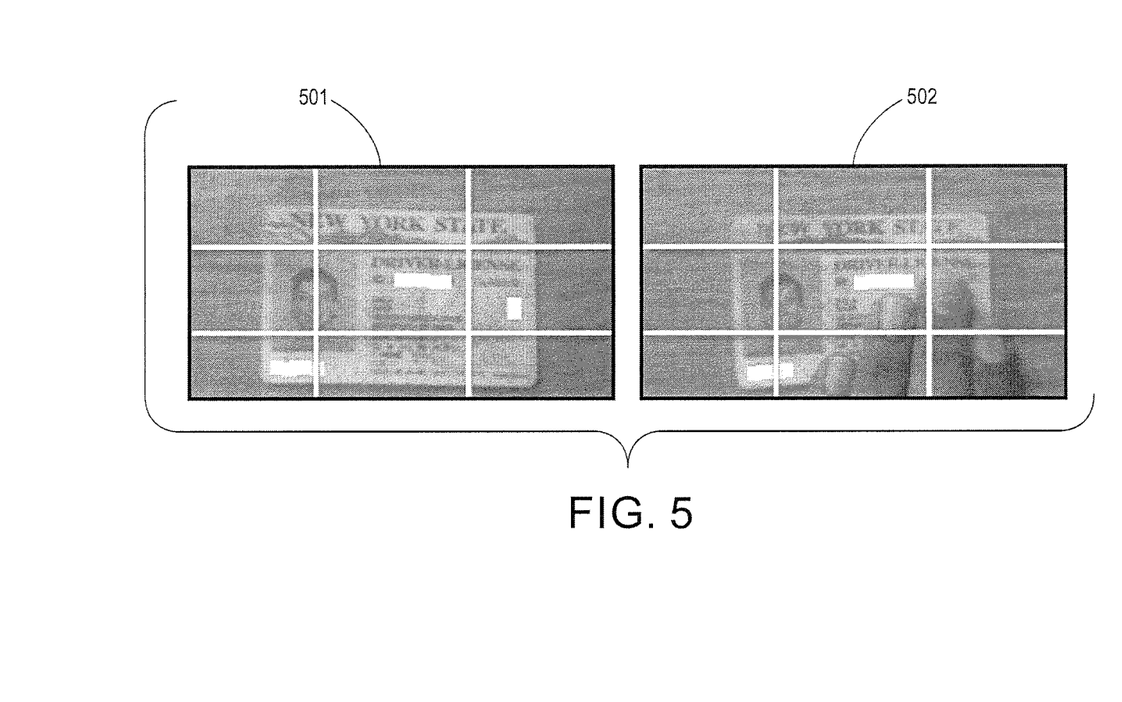
FIG. 5 depicts an example of the use of luminance analysis to detect a hand interaction.

As an example, referring to FIG. 5, to determine whether a frame exhibits the presence of an object such as the user's hand on the artifact, the system may identify multiple frames 501, 502 prior to a page turn event and divide each frame into a matrix of any number of N×N sub-blocks of pixels, wherein N>1, and it may measure the standard deviation σ of luminance values of the pixels within each sub-block. This is performed for both the reference frame 501, which is known to not include the presence of the user's hand, and a frame that is being analyzed prior to the page turn event 502. If the difference in σ between the reference frame and the analyzed frame is larger than a predefined or dynamically determined threshold, then the frame is identified as containing a hand-interaction event and thus still capture will not be triggered at the given instance.

This approach may be used even for non-paper artifacts like a driver's license, identification card, or credit card. The reference frame may be randomly sampled from a set of frames belonging to initial capture of page when it is un-occluded. For the first artifact, the set of frames belonging to the first 1-2 seconds may be used, while for subsequent pages or facets, the video captured immediately after a still capture can be used to pick a reference frame.

As noted above, another method of identifying frames exhibiting significant motion may include identifying camera motion events. The system may use data from the mobile electronic device's inertial or motion sensors such as an accelerometer for detecting frames with significant motion-blur due to hand movement. The accelerometer may record the acceleration of the device in three orthogonal directions (x, y and z) in space. The system also may include a clock or timer that outputs a time, and when recording the acceleration of the device, the system may use the time output (saved as a timestamp) to correlate accelerometer data with video frames.

The raw accelerometer data obtained may include an amount of noise, so the system may apply a smoothing filter:

$$acc^s_x(t)=\alpha * acc^s_x(t-1)+(1-\alpha)*acc_x(t)$$

where $acc^s_x(t)$ represents the filtered accelerometer value at timestamp t in the x direction, $acc_x(t)$ is the original acceleration value in the x direction, and α is a constant.

The system may subtract the effect of gravity from the three accelerometer readings. If we assume that the electronic device is stationary at time t=0, then the recorded values may be assumed to arise primarily due to gravity. The system can then subtract this initial effect from subsequent recordings to estimate the acceleration arising from hand motion. Alternatively, the system may use output data from the device's gyroscope to provide readings of angular speeds, derive orientation of the device accordingly, compute the effect of gravity in three directions over time, and subtract this from the accelerometer reading. The system also may determine the velocity for each video frame based on acceleration, time and previous velocity, and frames with significant velocity are marked for motion-blur. Computation of velocity may be done to detect motion when the device has zero or low acceleration. Using the timestamp of accelerometer data and the sampling rate of video, frames with significant (i.e., more than a threshold level of) acceleration and/or velocity may be marked by the decision module as being unsuitable for still capture.

Figure 6:
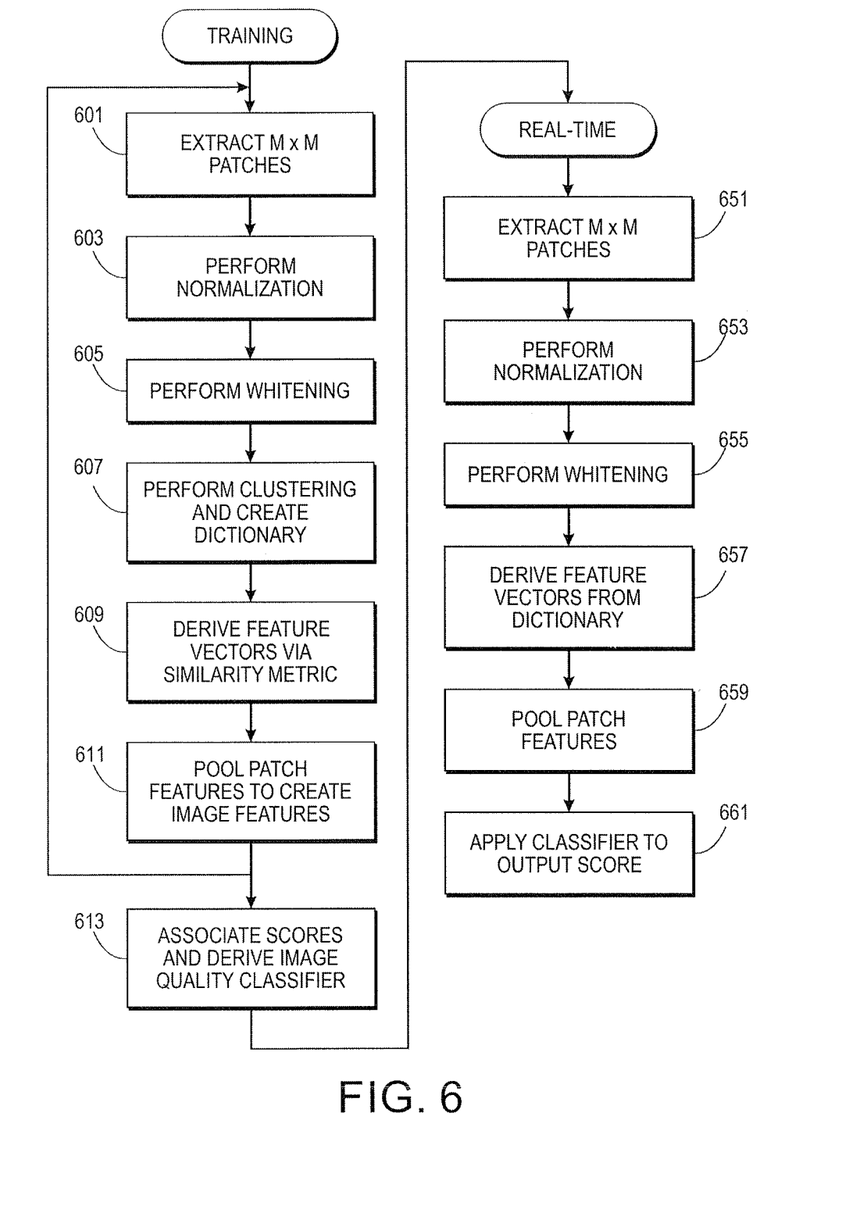
FIG. 6 is a process flow diagram describing a method of training a system to determine image quality, and using the trained system in real time.

In one embodiment, referring to FIG. 6, the system may use a learning based approach for predicting an optical character recognition (OCR) quality of a video frame. This may be done by determining a machine readability score for the frame. In an offline training phase, the system may access a training video, convert the RGB frames of the view to grayscale images, and randomly extract a set of M×M image patches from the training images 601. The image patches are converted to 1-D vectors of length $M^2$ and grouped into K clusters using a technique such as K-means clustering. The K cluster centroids are collected into a dictionary. In this example, M represents the patch size, and K represents the number of clusters. Choices of M and K may be determined heuristically.

As an example, the system may use values of M=11 and K=50. Before clustering, for the purpose of this example each patch must be normalized 603 by subtracting the mean and dividing by standard deviation of its elements. The system may then perform Zero Component Analysis (ZCA) based whitening 605 to the normalized patches. The system may cluster the patches to create a dictionary 607, that is, a data structure that captures representative structures (edges, corners etc.) in high quality images as well as images with distortions (e.g. blurry, low-contrast) resulting in poor OCR accuracy.

Next, each M×M image patch may be transformed into a feature vector as follows: The i-th patch is reformatted into a vector $x_i$ of length $M^2$, and normalized and/or whitened. Next, a dot product is computed between $x_i$ and each of the dictionary cluster centroids $D_1, \ldots, D_K$. This derives patch features via a similarity metric, which results in a feature vector $c_i$ 609 given by:

$$c_i = [\max(x_i \cdot D_1, 0) \ldots \max(x_i \cdot D_K, 0), \max(-x_i \cdot D_1, 0) \max(-x_i \cdot D_K, 0)]$$

Note that $c_i$ provides a measure of similarity between patch $x_i$ and the elements of dictionary D. Next, the $c_i$ for all patches in a single frame are pooled into a single feature vector β representing the entire video frame 611. There are several possible pooling techniques, of which one is element-wise "max-pooling" given by:

$$\beta_i = \max(c_{1i}, c_{2i}, \ldots, c_{Ni})$$

As shown in FIG. 6, this process may be repeated for any number of frames. At this stage, each frame or image from the training set is represented by feature vector β.

Next, the system associates with each training image an image quality score, optionally via an offline process. For example, in the case where the printed artifact is a text document, OCR accuracy can be used as an image quality score. Specifically, the training image may be processed through an OCR module, and the percentage of correctly recognized characters may be the score for that image. In an embodiment, the score may be categorized into one of two categories, "bad" or "good," by comparing OCR accuracy against a threshold. Finally, the system may derive an image quality classifier 613 that classifies each input feature β into one of these two class labels, or other class labels. Many classifiers exist in the literature or may be developed for the purpose of this application. For example, one classifier that may be used is the linear Support Vector Machine (SVM) classifier. Note that the classifier can readily be extended to handle more than two class labels.

As shown in the left side of FIG. 6, any or all of the aforementioned steps may be performed offline to train the dictionary and SVM classifier. Then, in a real time application as shown on the right side of FIG. 6, the system may perform some or all of the following steps on a given video frame that is received to determine an image quality score for the frame. Random M×M patches $x_i$ may be extracted from the frame 651 and optionally normalized 653 and/or whitened 655. The patches may be transformed into feature vectors $c_i$ 657 by, for example, determining a dot product against the dictionary elements that comprise the codebook that was formed during the training process. Features $c_i$ are pooled into a single feature β 659 representing the entire video frame, and this feature is then mapped through the derived SVM classifier to generate a score 661, such as a numeric score or other classification such as a "good" versus a "bad" classifier. The decision module would then compare the score against a threshold to determine if the frame represents a suitable instance for high resolution still capture.

The number of patches (N) extracted from a frame to predict the quality affects both the quality of score predicted and the computational time. The optimal value may be determined empirically in order to reduce the computation time.

Another indicator of capture quality is whether a complete view of the page or artifact is captured in at least one of the frames. To this end, the system may apply any now or hereafter known border detection algorithm to the frame to determine whether a full border (i.e., all edges of the facet) is present in the image frame. Three example approaches for this process include a Hough Transform technique, a template matching technique and a constant color border identification technique. In the first technique, edge detection is performed on the image using a standard method such as the Canny edge detector. A Hough Transform is performed on the edge image to detect straight lines. Finally the system may search for a set of four lines that connect to form a plausible shape for a printed artifact. In a template matching technique. a template may be obtained (such as in the form of a binary image file), and the system may assess data for each frame to find data matching that of the template. The system may calculate a score representing how closely the frame matches the template. If the frame has a score that equals or exceeds a certain threshold, then it may be accepted otherwise. Otherwise, it may be removed. A fast directional Chamfer-matching method is one example of a template matching process. In a constant color border identification technique, the system may separate the edge of the artifact with its content. For example, in technical articles and forms, there is a border of white space. The system may apply a distance-transform based border detection method to evaluate the quality of frame. It may find the distance of each background pixel (white) to nearest foreground pixel (black). If the value is low, the system may presume that the area is a content region. If the value is high, the system may presume that the area represents a border. The system may then threshold the distance transform values to obtain the borders and determine whether all four borders are present in the frame.

After detecting borders of the document, the system may use any or all of the following methods, or other methods, to determine whether the document satisfies image quality criteria: (1) determining whether all expected borders of the printed artifact have been detected, which may be the case if the system receives an input or has a knowledge base indicating an expected number of borders; (2) determining whether a shape formed by the borders is substantially a rectangle or square, such as by computing the ratio of the area of the shape with that of the tightest enclosing rectangle and considering a criterion to be satisfied if the ratio is greater than a threshold; or (3) determining a size of an area enclosed by the detected borders relative to a size of the area of the entire video image frame, and considering a criterion to be satisfied if a ratio of the first area (document size) to the second area (frame size) is greater than a threshold.

With reference to FIG. 4, inputs from the video sensing and analysis module 403, and optionally additional sensing modules such as the motion sensor 405 and audio sensor 407 may be fed to a decision module 401. The video sensing module 403, for example, may provide an estimate of global translational motion magnitude by the phase correlation method described earlier. The decision module 401 compares the motion magnitude against a preset threshold to determine if motion is acceptably low. Another output from the video sensing module 403 may be an image quality score computed with the previously described SVM classifier. The decision module 401 may compare the image quality score against another preset threshold to determine if frame quality is acceptably high. As another example, the document border computed by the previously described border detection algorithm may be processed by the decision module 401 to determine if the document is sufficiently well aligned with the mobile camera plane. This may be done by computing a ratio of the area of the shape defined by the detected document border to that of the tightest fitting rectangle around the same border. The ratio is compared against a preset threshold to determine if there is acceptable alignment between camera and document. As another example, data received from the motion sensor 405 pertaining to the magnitude of camera motion may be compared against a preset threshold to determine if camera motion is acceptably low.

The aforementioned decision module can apply one or more rules to determine whether the subset satisfies the one or more criteria. For example, the system may employ different strategies to rank, weight and combine the multiple decisions corresponding to the various sensing modules in order to make a final decision towards suitable instance for still capture. For example, one strategy is to require that at least a certain minimum fraction of decisions must be positive. A more general strategy is to compute a weighted sum of the binary outputs from the decisions, wherein an output of 1 indicates a positive decision that a given criterion is met, and an output of 0 indicates a negative decision that a criterion is not met, and to compare the weighted sum against a global threshold to determine a suitable instance for still capture. The weights would reflect the relative priorities of the decisions. For example, a low level of camera motion could be deemed more important, and thus assigned higher weights than close geometric alignment between camera and document. Note additionally that the user may, in some embodiments, always be given the option to override the decision module and capture the still photograph manually.

Furthermore, the strategy and rules used to combine the multiple decisions can be adapted with time and/or user behavior. Thus, the system may update the decision module's rules based on one or more of time, user behavior, and user feedback. For example, if the user repeatedly captures images of portions of documents, rather than the full document, then the threshold or weight corresponding to the full page coverage criterion can be adjusted automatically so as to de-emphasize the contribution of this criterion towards the overall decision to identify a suitable instance for still capture. As another example, if the application frequently takes an unusually long time to trigger still capture for a given user (for example 5 seconds or more), the criteria can be re-evaluated and weights and/or thresholds readjusted for faster automatic capture. In this event, a notification may be issued alerting the user of possible consequences that could result from changing the application's decision logic towards more rapid capture.

Returning to FIG. 3, as noted above, while processing frames the system may notify the user when it has received an acceptable image of a facet of the artifact. Real time notification and feedback may be very helpful to the user during the capture. Such feedback can serve as a signal to the user to proceed to the next page. This may be done while the video is continuously captured. Or, the system may use a simplified procedure for real time notification, in which it operates only on low-resolution viewfinder video frames, bypasses certain processing steps (e.g., the frame selection and hand detection step), and executes only certain steps such as accelerometer/gyroscope data processing and step quality scoring. Notification can be given in a variety of ways, including visual (e.g. a red/green flag on the display) or an audio prompt (e.g. a beep).

Figure 7:
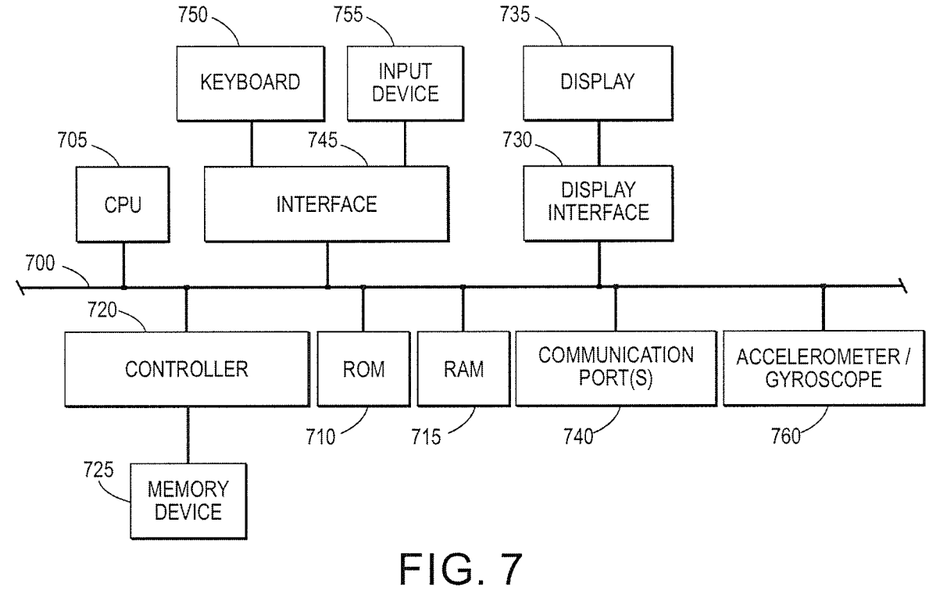
FIG. 7 depicts various embodiments of a computing device for implementing the various methods and processes described in this document.

The video capture method and process as described above may be performed and implemented by an operator of a portable electronic device having a video camera. FIG. 7 depicts an example of internal hardware that may be used to contain or implement the various computer processes and systems as discussed above. For example, the mobile electronic device as discussed above may include a similar internal hardware architecture to that as illustrated in FIG. 7. An electrical bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 6, is a processing device, computing device or processor as such terms are used within this disclosure. Read only memory (ROM) 710 and random access memory (RAM) 715 constitute examples of memory devices.

A controller 720 interfaces with one or more optional memory devices 725 that service as date storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device. The hardware also may include one or more motion detection devices 760, such as an accelerometer and/or gyroscope.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating an electronic file corresponding to a printed artifact, the method comprising:
by a video capture module of a mobile electronic device, capturing a video of a scene that includes a printed artifact;
by a processor, analyzing a plurality of image frames of the video in real time as the video is captured to identify whether the frame exhibits a page turn event by, for each frame:
determining whether the frame exhibits a luminance change that is greater than a threshold with respect to a reference frame in which there is known to be no page turn event,
if the frame exhibits a luminance change that is greater than the threshold, determining that the frame exhibits a page turn event, and
if the frame does not exhibit a luminance change that is greater than the threshold, determining that the frame does not exhibit a page turn event;
if the frame does not exhibit a page turn event:
automatically causing a photo capture module to capture a still image of the printed artifact so that the still image has a resolution that is higher than a resolution of the image frames from the video, and
saving the still image to a computer-readable file; and
otherwise not causing the photo capture module to capture a still image of the printed artifact.

2. The method of claim 1, wherein determining whether the frame exhibits a luminance change that is greater than a threshold with respect to a reference frame comprises:
detecting the presence of a luminance change that is greater than the threshold in the analyzed frame by:
dividing the analyzed frame into a set of N×N sub-blocks of pixels, where N equals an integer N>1,
for each sub-block, determining a standard deviation of luminance values of the pixels within each sub-block, and
for each sub-block, comparing the standard deviation with a standard deviation of a corresponding sub-block in the reference frame presence to yield a difference;
if the difference is greater than the threshold, then concluding that the analyzed frame includes the presence of a luminance change that is greater than the threshold.

3. The method of claim 1, further comprising:
upon identification of the page turn event, stopping the video capture module;
after capturing the still image:
resuming the video capture module, and
continuing to analyze, by a decision module in real time as the video is captured by the video capture module, image frames to identify an additional suitable instance for still capture;
upon identification of the additional suitable instance, automatically switching back to the photo capture module to capture an additional still image of the printed artifact; and
saving the additional captured still image to the computer-readable file.

4. The method of claim 3, wherein:
the additional suitable instance corresponds with one or more frames that contain a facet of the printed artifact that differs from a facet of the printed artifact that was contained in the previously-captured image; and
saving each captured still image in the computer-readable file comprises saving still images of each facet of the printed artifact as a multifaceted document.

5. The method of claim 1, further comprising, after capturing the still image:
presenting, via a display, the still image to a user for editing; and
receiving, via a user interface, one or more edits to the still image;
wherein saving the still image in the computer-readable file comprises saving the still image with the received edits.

6. The method of claim 1, further comprising, after analyzing a particular subset of the image frames:
determining that the particular subset failed to satisfy one or more image quality criteria; and
executing a feedback module that presents, via a user interface in real time while the device continues to capture the video of the scene, feedback for modification of a parameter of the device or of the video of the scene so that a subsequently captured subset of frames in the video will correspond to a suitable instance that satisfies the one or more image quality criteria.

7. The method of claim 1 further comprising:
determining an image quality score for the frame by:
extracting a set of image patches from the frame,
determining a feature vector for each of the patches from the frame,
pooling the determined feature vectors across the frame, and
retrieving a score for the frame by processing the pooled features via a classifier;
determining whether the image quality score exceeds a threshold image quality score representing machine readability of the printed artifact; and
wherein the method further comprises determining an image quality score for the frame.

8. The method of claim 1 wherein analyzing the plurality of image frames further comprises subsampling the series of image frames according to a spatial or temporal sampling criterion so that a representative set of image frames in the video is analyzed.

9. The method of claim 1, further comprising, for each captured still image in the computer-readable file, performing one or more of the following image processing operations on at least one of the captured still images: de-skew, de-rotation, perspective correction, automatic cropping, image enhancement, or image binarization.

* * * * *